(12) United States Patent
Marchand et al.

(10) Patent No.: US 6,449,034 B1
(45) Date of Patent: Sep. 10, 2002

(54) METHOD FOR CONTROLLING PERPENDICULARITY OF A CYLINDRICAL PART, SUCH AS A NUCLEAR FUEL PELLET

(75) Inventors: Michel Marchand, Foutenay le Fleury; Christian Richaud, Cairanne, both of (FR)

(73) Assignee: Compagnie Generale Des Matieres Nucleaires, Velizy-Villacoublay (FR)

( * ) Notice: Subject to any disclaimer, the term of this patent is extended or adjusted under 35 U.S.C. 154(b) by 0 days.

(21) Appl. No.: 09/622,109
(22) PCT Filed: Dec. 14, 1999
(86) PCT No.: PCT/FR99/03132
§ 371 (c)(1), (2), (4) Date: Aug. 11, 2000
(87) PCT Pub. No.: WO00/36369
PCT Pub. Date: Jun. 22, 2000

(30) Foreign Application Priority Data

Dec. 15, 1998 (FR) .............................................. 98 15824

(51) Int. Cl.$^7$ .......................... G01B 11/26; G01B 11/14; G01B 11/02; G21C 17/00
(52) U.S. Cl. .............. 356/139.03; 356/152.1; 356/621; 356/622; 356/635; 356/638; 376/258
(58) Field of Search ......................... 356/141.3, 139.03, 356/485, 490, 152.1, 635, 638–640, 621, 622; 376/258

(56) References Cited

U.S. PATENT DOCUMENTS

| 3,790,284 | A | * | 2/1974 | Baldwin |
| 3,801,203 | A | | 4/1974 | Hyland et al. |
| 4,978,223 | A | | 12/1990 | Kutchenriter et al. |
| 5,513,004 | A | * | 4/1996 | Naqwi et al. |
| 5,774,210 | A | | 6/1998 | Gweon et al. |

FOREIGN PATENT DOCUMENTS

FR  2 644 238  9/1990

* cited by examiner

Primary Examiner—Stephen C. Buczinski
(74) Attorney, Agent, or Firm—Pearne & Gordon LLP

(57) ABSTRACT

In order to control the perpendicularity of a component (10) such as a nuclear fuel pellet, this component is placed upon a support plane and measurements are taken, by means of two pairs of laser micrometers (A1, A2; B1, B2), of the distances separating diametrically opposed generators of the component from a rod of reference (T, T'), at two different levels and in two measuring planes (P, P') perpendicular to each other. From this is derived a maximum out-of-true perpendicularity of the component being controlled.

12 Claims, 3 Drawing Sheets

METHOD FOR CONTROLLING PERPENDICULARITY OF A CYLINDRICAL PART, SUCH AS A NUCLEAR FUEL PELLET

TECHNICAL FIELD

This invention relates to a process intended to control the perpendicularity of plane faces of a cylindrical component, relative to the axis of symmetry of this component.

More exactly, the invention concerns a process allowing the measurement of an out-of-true perpendicularity of at least one generator of the component, relative to one of its faces, over a given length of the component.

The process according to the invention can be used in all cases where it is required to carry out a very precise measurement of the perpendicularity of a cylindrical component. A preferred application concerns the control of the perpendicularity of nuclear fuel pellets during their manufacture.

STATE OF THE ART

The fuel rods used in nuclear reactors include cylindrical nuclear fuel pellets, mounted end to end in metal sheaths. During the manufacture of the pellets, their size and their geometry, particularly their perpendicularity, must be regularly controlled, so as to verify that they comply fully with the required tolerances.

In existing manufacturing shops, the size of the nuclear fuel pellets is measured with the help of mechanical probes and micrometric measurement means. The precision of the measurements carried out in this way is of the order of 20 $\mu$m.

Furthermore the perpendicularity of the circular faces of the pellets, relative to their axis of symmetry, is generally controlled by sounding. To this end, the sampled pellet is usually placed horizontally on rollers which are also horizontal. Rotating the rollers or a pressure roller rotates the pellet. Measurements are then taken by a micrometric probing of one of the two circular faces of the pellets. The precision of the measurements carried out in this way is comparable to that of the size measurements, in other words of the order of 20 $\mu$m.

The disadvantages of this usual technique for controlling perpendicularity are that it does not allow pellets with a reduced or non-existent collar to be controlled and that it does not allow pellets of different diameters to be controlled without adaptation.

DISCLOSURE OF THE INVENTION

The object of the invention is to be exact a process for controlling the perpendicularity of a cylindrical component, such as a nuclear fuel pellet, obtaining a precision of measurement substantially greater than existing control techniques, in other words above 8 $\mu$m.

A further object of the invention is a process allowing the perpendicularity of cylindrical components of different diameters and of different lengths to be controlled without any modification.

Moreover, the invention concerns a process for controlling the perpendicularity of cylindrical components obtaining measurements which are stable over time and the implementation of which is compatible with the instigation of controls within a glove box.

In accordance with the invention, a process is proposed for controlling the perpendicularity of a plane face of a cylindrical component, relative to an axis of symmetry of said component, characterised in that it includes the steps consisting in:

laying said face of the component on a fixed support plane such that said axis of symmetry passes approximately through a fixed point of reference of said support plane; and determining optically, in at least one measuring plane passing through the point of reference and perpendicular to the support plane, an out-of-true perpendicularity of a least one generator of the component, contained in the measuring plane, relative to said face, the out-of-true perpendicularity being determined by measuring optically, at two different levels of the component along its axis of symmetry, the distance separating each generator from a fixed straight line of reference perpendicular to the support plane and contained in the measuring plane, then by calculating the difference between the distances measured at each of the two levels.

In a preferred embodiment of the invention any out-of-true perpendicularity of the two generators of the component, contained in the measuring plane, is determined optically.

In this preferred embodiment, any out-of-true perpendicularity in two measuring planes perpendicular to each other is also determined optically.

In this case, a maximum out-of-true perpendicularity $X_{max}$ is calculated to advantage by applying the equation:

$$X_{max} = \sqrt{X1^2 + X2^2},$$

where X1 and X2 represent the greatest out-of-true perpendicularity of the two generators in each of the two measuring planes respectively.

To advantage, the distances at each of the two levels are measured simultaneously by means of at least one pair of laser scanning micrometers provided with emitting slots parallel to the measuring plane, the above mentioned slots emitting laser arrays which cut an axis of reference perpendicular to the support plane, passing trough the point of reference at each of the two levels.

When the measurements are taken in two measuring planes perpendicular to each other, the distances in these two planes are then measured simultaneously, by means of two pairs of laser scanning micrometers.

Each of the laser scanning micrometers used includes to advantage an emitter and a receiver located on either side of the component. The emitter used is provided with the emitting slot and must be placed at a distance of 60±2 mm from the axis of reference. The receiver is aligned with the emitter and placed at a distance of about 95 mm from this axis.

In order for the gap between the 2 levels of measurement to be compatible with the smallest length of the components to be controlled, despite the space taken up by the micrometers, the two micrometers of each pair of micrometers are placed to advantage such that the laser arrays emitted by their emitting slots are respectively parallel to the support plane and inclined relative to this plane.

In the preferred embodiment of the invention, on the support plane, for each pair of micrometers next to and at a distance from the component, is mounted a rod of reference of which the generator, turned towards the component and located in the measuring plane, substantiates the straight line of reference. More exactly, each rod of reference is mounted to advantage at the same distance from the emitter as the axis of reference.

To ensure good reproducibility of the measurements, the support plane is to advantage substantiated by three support zones, evenly distributed around the point of reference.

In a preferred application of the invention, the cylindrical components controlled are nuclear fuel pellets.

BRIEF DESCRIPTION OF THE DRAWINGS

A preferred embodiment of the invention will now be described, as a non-restrictive example, with reference to the appended drawings, in which.

DETAILED DESCRIPTION OF A PREFERRED EMBODIMENT OF THE INVENTION

In accordance with the invention and as shown by FIGS. 1 to 4, the control of the perpendicularity of cylindrical components such as nuclear fuel pellets 10, is achieved by means of optical measurements, which allow the required needs for precision to be met.

More exactly, in the preferred embodiment shown, the measurements are made by four laser scanning micrometers. These four micrometers may particularly be micrometers of the LS 3033 SO type of the KEYENCE Company.

Each of the micrometers includes an emitter, which emits a laser array through a horizontal slot, and a receiver located strictly in the axis of the corresponding emitter.

Moreover, the micrometers are arranged in twos so as to form two pairs of micrometers located in two vertical planes perpendicular to each other.

Figure 1:
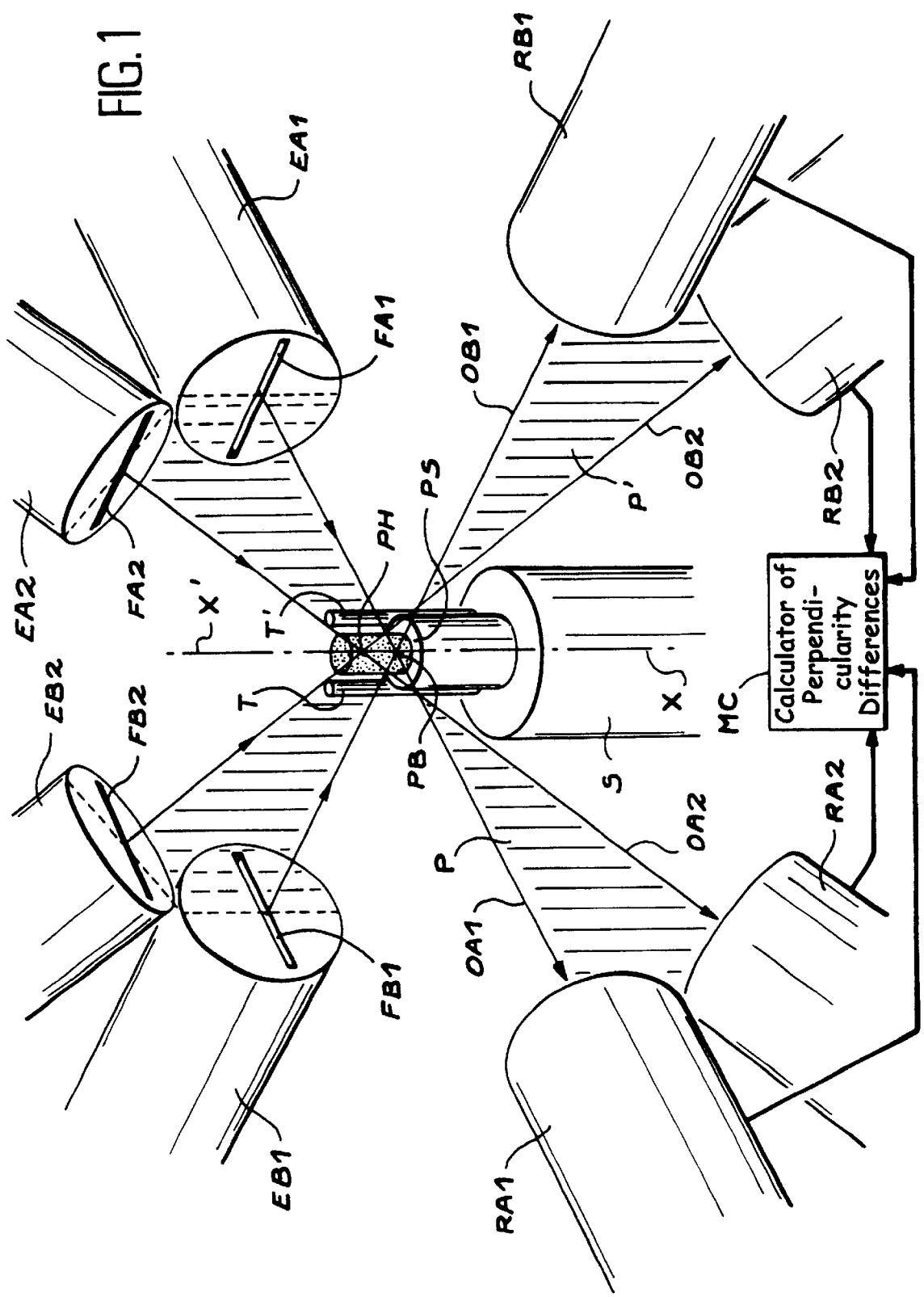
FIG. 1 is a perspective view which shows diagrammatically the control of the perpendicularity of a nuclear fuel pellet by the process according to the invention.
Figure 2:
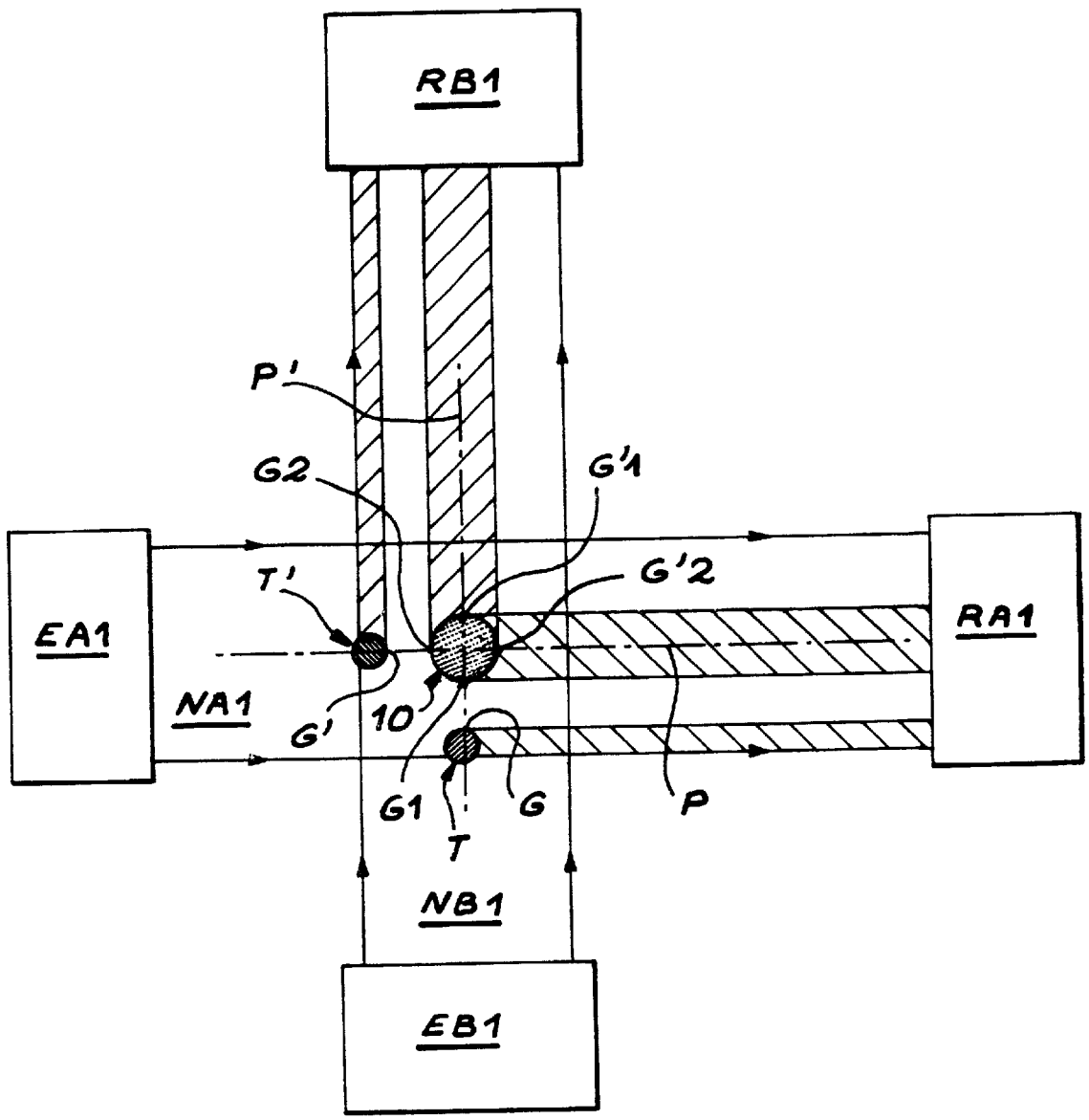
FIG. 2 is a diagrammatic view from above, showing the principle of measurement.

More exactly and as shown diagrammatically in FIG. 1, a first pair of micrometers includes a first micrometer A1, of horizontal axis OA1, and a second micrometer A2, of inclined axis OA2. The first micrometer A1 is substantiated by an emitter EA1 and by a receiver RA1. The second micrometer A2 is substantiated by an emitter EA2 and by a receiver RA2. The respective axes OA1 and OA2 of these two micrometers A1 and A2 are contained in a first vertical plane P. In FIG. 1, the references FA1 and FA2 denote the respective emitting slots of the emitters EA1 and EA2, through which emerge the plane laser arrays of the micrometers A1 and A2. The laser array NA1 emitted by the slot FA1 of the emitter EA1 is shown in FIG. 2.

The second pair of micrometers includes a first micrometer B1, of horizontal axis OB1, and a second micrometer B2, of inclined axis OB2. The first micrometer B1 is substantiated by an emitter EB1 and by a receiver RB1. The second micrometer B2 is substantiated by an emitter EB2 and by a receiver RB2. The axes OB1 and OB2 are contained in a second vertical plane P', perpendicular to the plane P containing the axes OA1 and OA2 of the first pair of micrometers A1 and A2. In FIG. 1, the references FB1 and FB2 denote the emitting slots through which the plane laser arrays of the micrometers B1 and B2 emerge from the emitters EB1 and EB2 respectively. The laser array emitted by the slot FB1 of the emitter EB1 is shown as NB1 in FIG. 2.

As also shown in FIG. 1, the planes P and P' in which are found each of the pairs of micrometers A1, A2 and B1, B2, intersect along a vertical axis of reference XX'. The micrometers and, consequently, the axis of reference XX', occupy fixed positions.

Furthermore, the axes OA1 and OB1 of the micrometers A1 and B1 are placed at the same level, so as to intersect at a fixed low point PB of the axis of reference XX'.

In a comparable way, the inclined axes OA2 and OB2 of the micrometers A2 and B2 are arranged so as to intersect at a fixed high point PH of the axis of reference XX'.

The distance separating the points PB and PH is selected so as to be appreciably less than the length of the shortest cylindrical pellet 10 able to be controlled.

As shown also in FIG. 1 the control installation includes additionally a fixed support S, provided along the vertical axis of reference XX', under the low point PB. At its upper end, the support S forms a horizontal support plane PS, located a short distance beneath the low intersection point PB of the axis OA1 and OB1. The support plane PS is provided to receive a pellet 10 to be controlled. More exactly, the pellet 10 is placed on the support plane PS by one of its circular plane faces, such that its axis of symmetry YY' (FIG. 3) coincides approximately with the vertical axis of reference XX'. The intersection point of the support plane PS, with the axis XX', is called <<point of reference>> and denoted by the reference PR in FIG. 3.

Figure 4:
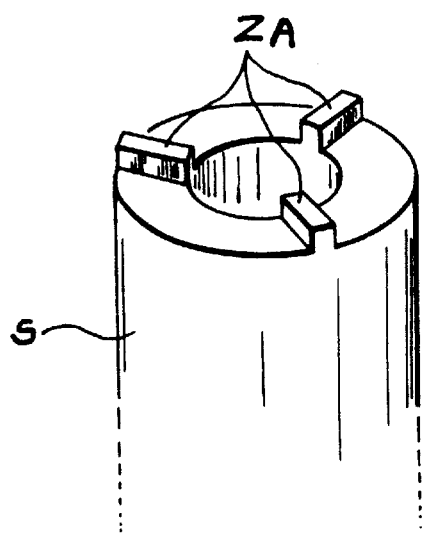
FIG. 4 is a perspective view showing a preferred embodiment of the support plane on which the pellet to be controlled is placed.

As has been shown in FIG. 4, the support plane PS of the fixed support S may be substantiated by three support zones ZA, evenly distributed around the point of reference PR. These support zones ZA may particularly be obtained by machining the upper plane face of the fixed support S, for example by machining in this face a central groove and three peripheral grooves.

To complete the installation, it can be seen particularly in FIGS. 1 and 2 that the fixed support S also carries two cylindrical and vertical rods of reference T and T', the axes of which are located in the planes P' and P respectively. The two rods of reference T and T' are placed at a same distance from the vertical axis of reference XX'. This distance is greater than the radius of the pellets 10 to be controlled, such that the pellet 10 is not in contact with the rods. On the other hand, the distance separating the rods of reference T and T' from the axis of reference XX' is less than half the width of the laser arrays of each of the micrometers, such that the rod of reference T is on the trajectory of the laser arrays emitted by the emitters EA1 and EA2 and that the rod of reference T' is on the trajectory of the laser arrays emitted by the emitters EB1 and EB2.

Moreover, and as is shown particularly in FIG. 2, the diameter of the rods of reference T and T' is sufficiently large for the rod T to overlap slightly the laser arrays emitted by the emitters EA1 and EA2 and for the rod T' to overlap slightly the laser arrays emitted by the emitters EB1 and EB2. An overlap of about 1 mm of each of the rods T and T', relative to the corresponding laser arrays can be provided. This overlap allows edge effects to be reduced to the maximum.

In order to ensure an optimum precision of measurement, each of the emitters EA1 and EB1 is placed at a distance of 60±2 mm from the low intersection point PB of its respective axis OA1, OB1, with the vertical axis of reference XX'. Likewise, each of the emitters EA2 and EB2 is placed at a distance of 60±2 mm from the upper intersection point PH of its respective axis OA2, OB2, with the vertical axis of reference XX'.

Furthermore, each of the receivers RA1 and RB1 is placed at a distance of about 95 mm from the low point PB and each of the receivers RA2 and RB2 is placed at a distance of about 95 mm from the high point PH.

The placing of the rod of reference T in the plane P' allows this rod to be placed approximately at the same distance from the emitters EA1 and EA2 as the controlled pellet 10, while avoiding disturbance to the measurements made by the second pair of micrometers B1 and B2.

In a comparable way, the mounting of the rod of reference T' in the plane P allows this rod T' to be placed approximately at the same distance from the emitters EB1 and EB2 as the pellet 10 to be controlled, without disturbing the measurements made by the first pair of micrometers A1 and A2.

In the arrangement, which has just been described and as will be better understood in the following description, the plane P' constitutes the measuring plane for the micrometers A1 and A2 and the plane P constitutes the measuring plane for the micrometers B1 and B2. The laser array emission slots FA1 and FA2 of the first pair of micrometers A1 and A2 are parallel to the measuring plane P'. In a comparable way, the emitting slots FB1 and FB2 through which the laser arrays emerge from the second pair of micrometers B1 and B2, are parallel to the measuring plane P.

The control process implementing this installation and illustrating a preferred embodiment of the invention will now be described.

Figure 3:
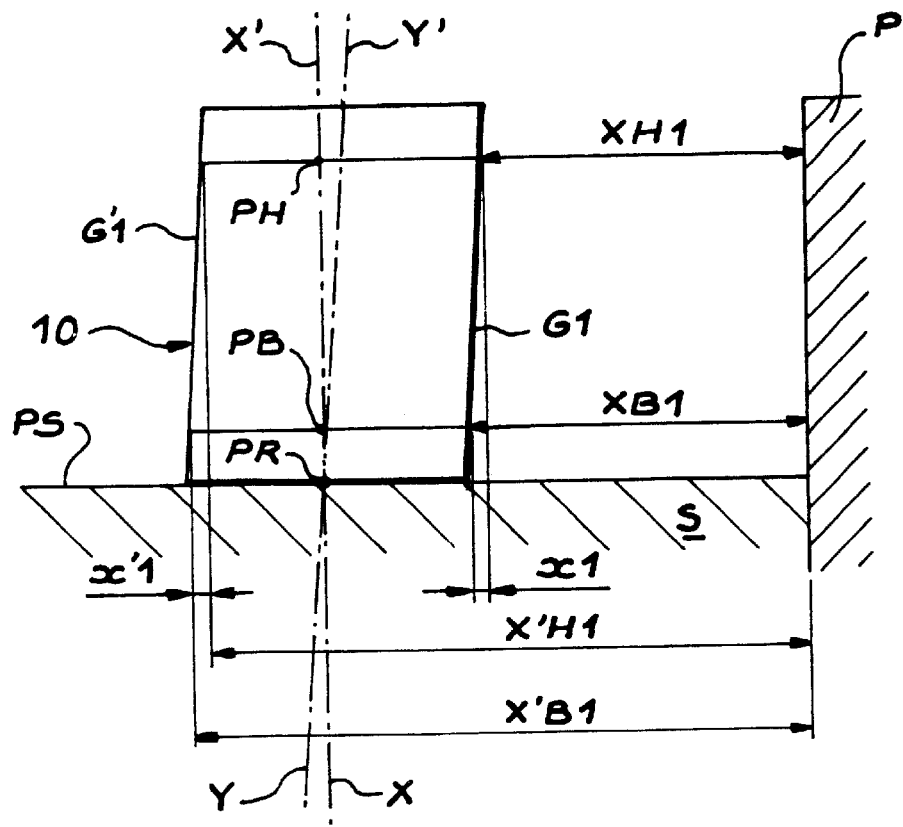
FIG. 3 is a side view, on a larger scale, showing the measurements and the calculations made by the process according to the invention in the case of a voluntarily enhanced out-of-true perpendicularity.

When it is required to control the perpendicularity of a cylindrical component, such as a nuclear fuel pellet 10, a circular plane face of this pellet 10 is placed on the support plane PS, such that the axis of symmetry YY' of the pellet coincides approximately with the vertical axis XX'. The axis of symmetry of the pellet 10 then passes approximately through the point of reference PR of the support plane PS as shown in FIG. 3. It may be noted that the repeatability of the placing of the pellet 10 on the support plane PS is particularly good when this support plane is given the geometry shown in FIG. 4.

When the installation is implanted in a glove box, as the control of nuclear fuel pellets requires, the placing of the pellet 10 on the support plane PS can be carried out by a robot grip. This placing poses no particular problem since the control is made by optical measurements which allow the space located above the support plane PS to be totally liberated.

When the pellet 10 rests on the support plane PS, the four micrometers A1, A2, B1 and B2 are implemented simultaneously so as to make the measurements which will now be described with reference to FIGS. 2 and 3.

As shown in FIG. 2 on which only the micrometers A1 and B1 appear, the laser array NA1, NB1, produced by the emitter of each micrometer projects, onto its receiver, shadows in true size, in other words at scale 1, of the pellet 10 and of the rod T, T', located in the measuring plane of the micrometer under consideration.

As is shown, particularly, in FIG. 3, it is thus possible to measure, at the levels of the low point PB and of the high point PH, the horizontal distances between the two generators of the pellet 10 located in the measuring plane and the generator turned towards this pellet of the rod of reference T, T', located in the measuring plane. This last generator is denoted by the reference G for the rod T and by the reference G' for the rod T'. It constitutes a straight line of reference, in each of the measuring planes P and P'.

In this way, the micrometer A1 allows the measurement, in the measuring plane P', of the distance XB1 separating the straight line of reference G from the generator G1, the closest to the rod T, of the pellet 10. The micrometer A1 also measures in this same plane P', the distance X'B1 separating the straight line of reference G from the generator G'1, the furthest from the rod T, of the pellet 10. The distances XB1 and X'B1 are measured at the level of the low point PB.

In the same measuring plane P' which corresponds to the plane in FIG. 3, the micrometer A2 measures at the level of the high point PH, the distance XH1 separating the straight line of reference G from the generator G1 of the pellet 10, as well as the distance X'H1 separating the straight line of reference G from the generator G'1 of the pellet 10.

In the vertical measuring plane P perpendicular to the measuring plane P', the micrometers B1 and B2 make comparable measurements, at the level of the low point PB and at the level of the high point PH respectively. More exactly, the micrometer B1 measures, at the level of the low point PB, the distances XB2 and X'B2 separating the straight line of reference G' from the generators G2 and G'2 respectively of the pellet 10 located in the plane P. Likewise, the micrometer B2 measures, at the level of the high point PH, the distances XH2 and X'H2 separating the straight line of reference G' from the generators G2 and G'2 respectively of the pellet 10.

As has been shown, in an enhanced manner, in FIG. 3, an out-of-true perpendicularity of the pellet 10 is expressed by differences between the comparable distances, measured at the level of the low point PB and at the level of the high point PH.

In this way, an out-of-true perpendicularity of the pellet 10 in the plane P' is expressed by a difference x1 between the distances XB1 and XH1 measured by the micrometers A1 and A2 respectively. This same out-of-true perpendicularity is also expressed by a difference x'1 between the distances X'B1 and X'H1 measured by the same micrometers.

In the measuring plane P, perpendicular to the previous one, an out-of-true perpendicularity of the pellet 10 is also expressed by a difference x2 between the distances XB2 and XH2 measured by the micrometers B1 and B2 respectively, as well as by a difference x'2 between the distances X'B2 and X'H2 measured by the same micrometers.

The values of these four differences x1, x'1, x2 and x'2 are calculated from the distance measure simultaneously by the four micrometers. This calculation may particularly be made by a calculator MC associated with the installation previously described.

A maximum theoretical out-of-true perpendicularity $X_{max}$ is then calculated by applying the equation:

$$X_{max} = \sqrt{X1^2 + X2^2},$$

in which X1 represents the greatest of the differences x1 and x'1 previously calculated and X2 represents the greatest of the differences x2 and x'2 previously calculated.

It can be demonstrated that the preceding equation is valid whatever the measuring planes P and P', provided that the maximum value $X_{max}$ remains very small relative to the diameter of the pellet. This condition is still respected, since the maximum out-of-true perpendicularity of the pellets 10 must not exceed 150 micrometers, whereas the diameter of the pellets is between 8 mm and 10 mm.

The process, according to the invention, a preferred embodiment of which has just been described, obtains a precision of measurement above 8 µm, in other words appreciably more than that of existing processes.

Moreover the proposed measurement technique allows, without any adaptation, for the control of cylindrical components of different lengths since the high point PH, at which measurements are made, is determined in advance, in order to be inside the shortest components to be controlled.

In a comparable way, it is possible to control, without adaptation, components of different diameters, such as pellets of which the diameter varies from 8.05 mm to 10.35 mm.

Moreover, the process according to the invention allows the stability of measurements to be guaranteed over time, including during variations in light, dust and luminosity. The presence of the rods of reference particularly allows the stability of the measurements to be guaranteed.

Finally, the technique proposed can easily be used inside a glove box, which allows it to be applied without difficulty to the control of nuclear fuel pellets.

It is notable that the process according to the invention may be simplified relative to the preferred embodiment previously described. In this way, instead of making two measurements on the opposing generators of the component in each measuring plane, it is possible to make only one single measurement, still at the levels of the high and low points, between the straight line of reference and one of the generators of the component. Likewise, instead of being made in two planes of reference perpendicular to each other, the measurements may be limited to a single one of these planes, which leads to the elimination of one of the pairs of micrometers, and the corresponding rod of reference. Furthermore, instead of being constituted by a generator G or G' of a rod of reference T or T', each straight line of reference being used for measurement may be substantiated in any other manner, without departing from the framework of the invention. Lastly, it is notable that the described horizontal orientation of the support plane PS is not imperative, in so far as a tight contact between the circular face of the component and this support plane is provided by a mechanical, pneumatic or other means. The orientations of the laser micrometers are then modified as a consequence.

What is claimed is:

1. A process for controlling the perpendicularity of a plane face of a cylindrical component relative to an axis of symmetry of said component, said process including the steps comprising:

placing said face of the component on a fixed support plane such that said axis of symmetry passes approximately through a fixed point of reference of said support plane; and determining optically, in at least one measuring plane passing through the point of reference and perpendicular to the support plane, an out-of-true perpendicularity of a generated straight line contained in the measuring plane, relative to said face, by measuring optically, at two different levels of the component along its axis of symmetry, the distance separating the generated straight line from a fixed straight line of reference perpendicular to the support plane and contained in the measuring plane, and then calculating the difference between the distances measured at each of the two levels.

2. The process as in claim 1, wherein any out-of-true perpendicularity of two generated straight lines contained in the measuring plane is determined.

3. The process as in claim 2 wherein any out-of-true perpendicularity in two measuring planes perpendicular to each other is determined.

4. The process as in claim 3, wherein a maximum out-of-true perpendicularity distance $X_{max}$ is calculated by applying the equation:

$$X_{max} = \sqrt{X1^2 + X2^2}$$

where X1 and X2 represent the greatest out-of-true distances calculated for the two generated straight lines, in each of the two measuring planes respectively.

5. A process as in claim 3, wherein distances are measured simultaneously at each of the two levels, by means of at least one pair of laser scanning micrometers provided with emitting slots parallel to the measuring plane, said slots emitting laser arrays which cut an axis of reference perpendicular to the support plane, passing through said point of reference, at each of said levels.

6. A process as in claim 5, wherein the distances in the two measuring planes are measured simultaneously by means of two pairs of laser scanning micrometers.

7. A process as in claim 5, wherein laser scanning micrometers are used each including an emitter and a receiver located on either side of the component, said emitter being provided with the emitting slot and placed at a distance of 60±2 mm from the axis of reference, and said receiver being aligned with the emitter and placed at a distance of about 95 mm from said axis of reference.

8. A process as in claim 5, wherein the laser arrays emitted by the emitting slots of the two micrometers of each pair are respectively parallel to the support plane and inclined relative to it.

9. A process as in claim 7, wherein on the support plane, adjacent to and at a distance from the component is mounted at least one rod of reference of which a generator turned towards the component and located in the measuring plane substantiates said straight line of reference.

10. A process as in claim 9, wherein each rod of reference is mounted approximately at the same distance from the emitter as the axis of reference.

11. A process as in claim 1, wherein the component is placed on a support plane substantiated by three support zones evenly distributed around said point of reference.

12. A process as in claim 1, wherein the controlled component is a nuclear fuel pellet.

* * * * *